United States Patent
Tsuchiya (10) Patent No.: US 11,989,018 B2
(45) Date of Patent: May 21, 2024

(54) REMOTE OPERATION DEVICE AND REMOTE OPERATION METHOD

(71) Applicant: HONDA MOTOR CO., LTD., Tokyo (JP)

(72) Inventor: Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 363 days.

(21) Appl. No.: 17/485,409

(22) Filed: Sep. 25, 2021

(65) Prior Publication Data
US 2022/0011770 A1 Jan. 13, 2022

Related U.S. Application Data

(63) Continuation of application No. PCT/JP2019/014301, filed on Mar. 29, 2019.

(51) Int. Cl.
*G05D 1/00* (2024.01)
*H04Q 9/00* (2006.01)

(52) U.S. Cl.
CPC ............ *G05D 1/0038* (2013.01); *H04Q 9/00* (2013.01)

(58) Field of Classification Search
CPC ......... G05D 1/0038; G05D 2201/0213; G05D 1/0016; G05D 1/0022; H04Q 9/00; H04Q 2209/84; G08C 17/02
USPC ............................................................ 701/2
See application file for complete search history.

(56) References Cited

U.S. PATENT DOCUMENTS

| | | | | |
|---|---|---|---|---|
| 4,361,202 A | * | 11/1982 | Minovitch | B60K 31/0058 246/167 D |
| 5,987,364 A | * | 11/1999 | Le Gusquet | B60W 40/02 701/28 |
| 10,604,155 B2 | | 3/2020 | Takahashi | |
| 2007/0152804 A1 | * | 7/2007 | Breed | G01S 19/47 701/301 |
| 2008/0048844 A1 | * | 2/2008 | Watanabe | G07C 5/008 340/425.5 |
| 2010/0256852 A1 | * | 10/2010 | Mudalige | G08G 1/164 701/24 |
| 2013/0204466 A1 | * | 8/2013 | Ricci | H04L 12/6418 701/2 |
| 2014/0207535 A1 | * | 7/2014 | Stefan | G07C 5/008 701/1 |

(Continued)

FOREIGN PATENT DOCUMENTS

| | | | | |
|---|---|---|---|---|
| CN | 103472815 A | | 12/2013 | |
| CN | 104875712 A | * | 9/2015 | ......... B60R 25/2072 |

(Continued)

OTHER PUBLICATIONS

Amari Takeshi, JP2004217171A.translate. English, Nissan Motor Co Ltd, Remote Control Device for Vehicle. (Year: 2004).*

(Continued)

*Primary Examiner* — B M M Hannan
(74) *Attorney, Agent, or Firm* — Thomas| Horstemeyer, LLP (57) ABSTRACT

A remote operation device for operating a remote target device includes an acquisition unit for acquiring quality of communication between the target device and the remote operation device, and a setting unit for setting an authority of the remote operation device related to an operation of the target device based on the communication quality.

11 Claims, 8 Drawing Sheets

(56) References Cited

U.S. PATENT DOCUMENTS

| | | | |
|---|---|---|---|
| 2015/0163306 A1* | 6/2015 | Nakagawa | B60R 25/24 |
| | | | 709/225 |
| 2016/0264136 A1* | 9/2016 | Minoiu Enache | B60W 30/095 |
| 2016/0308743 A1* | 10/2016 | Alam | H04L 43/10 |
| 2017/0197549 A1* | 7/2017 | Vladimerou | B60W 30/08 |
| 2017/0259820 A1 | 9/2017 | Takahashi | |
| 2017/0309183 A1* | 10/2017 | Nordbruch | B62D 15/027 |
| 2017/0335548 A1* | 11/2017 | Noda | B60R 1/00 |
| 2018/0190128 A1* | 7/2018 | Saigusa | B60W 40/04 |
| 2018/0334136 A1* | 11/2018 | Chaston | G06V 20/56 |
| 2019/0126890 A1* | 5/2019 | Song | B60R 25/241 |
| 2019/0152472 A1* | 5/2019 | Aksyutina | B60W 30/06 |
| 2019/0163176 A1* | 5/2019 | Wang | G05D 1/0088 |
| 2019/0179302 A1* | 6/2019 | Tokura | G05D 1/0011 |
| 2019/0204822 A1* | 7/2019 | Hika | G05D 1/0022 |
| 2020/0012274 A1* | 1/2020 | Kamiya | B66F 9/24 |
| 2020/0047773 A1* | 2/2020 | Akaba | G08G 1/16 |
| 2020/0189570 A1* | 6/2020 | Yamanaka | G08G 1/14 |
| 2020/0247652 A1* | 8/2020 | Okamoto | G05D 1/0214 |
| 2020/0333778 A1* | 10/2020 | Lambert | G05D 1/0255 |
| 2021/0009392 A1* | 1/2021 | Kamiya | G08C 17/02 |
| 2021/0116907 A1* | 4/2021 | Altman | G05D 1/0038 |
| 2021/0221664 A1* | 7/2021 | Okamoto | G05D 1/0055 |
| 2023/0322538 A1* | 10/2023 | Kamiya | G06F 3/0488 |
| | | | 701/50 |

FOREIGN PATENT DOCUMENTS

| | | | | |
|---|---|---|---|---|
| CN | 107925958 A | * | 4/2018 | ............ H04W 4/00 |
| DE | 102016223788 A1 | * | 5/2018 | |
| JP | 2004-217171 A | | 8/2004 | |
| JP | 2013-115803 A | | 6/2013 | |
| JP | 2017050797 A | * | 3/2017 | |
| JP | 2020-027988 A | | 2/2020 | |
| WO | 2016/038931 A1 | | 3/2016 | |
| WO | 2018/142992 A1 | | 8/2018 | |
| WO | 2020/202372 A1 | | 10/2020 | |

OTHER PUBLICATIONS

Amari Takeshi, JP2004217171A. Drawing, Nissan Motor Co Ltd, Remote Control Device for Vehicle. (Year: 2004).*

International Search Report and Written Opinion for PCT/JP2019/014301 mailed Jun. 18, 2019.

Japanese Office Action issued for Japanese Patent Application No. 2021511746 mailed on May 15, 2023 (with Partial Translation).

Chinese Office Action for Chinese Patent Application No. 201980094011.1 mailed Apr. 19, 2023.

* cited by examiner

| | OPERATION CONTENT (HIGHWAY) | HIGH QUALITY | LIMIT QUALITY | MEDIUM QUALITY | LOW QUALITY |
|---|---|---|---|---|---|
| | | 502 | 503 | 504 | 505 |
| SINGLE-LANE OPERATION | MINIMUM INTER-VEHICLE DISTANCE | x1.0 | x1.2 | x1.5 | x1.5 |
| | VEHICLE SPEED UPPER LIMIT | No limit | 100km/h | ACC | ACC |
| | STEERING | Allow | Allow | LKAS | LKAS |
| | IN-LANE STOP | Allow | Allow | ACC(LSF) | ACC(LSF) |
| MULTI-LANE OPERATION | LANE CHANGE | Allow | Allow | AD | AD |
| | MERGING/BRANCHING | Allow | Restrict | AD | AD |
| | ROAD SHOULDER STOP | Allow | Allow | Allow | AD |

FIG. 6

| OPERATION CONTENT (GENERAL ROAD) 601 | | HIGH QUALITY 602 | LIMIT QUALITY 603 | MEDIUM QUALITY 604 | LOW QUALITY 605 |
|---|---|---|---|---|---|
| SINGLE-LANE OPERATION | MINIMUM INTER-VEHICLE DISTANCE | x1.0 | x1.2 | x1.5 | x1.5 |
| | VEHICLE SPEED UPPER LIMIT | No limit | 60km/h | 50km/h | ACC |
| | STEERING | Allow | Restrict | Restrict | LKAS |
| | IN-LANE STOP | Allow | Allow | ACC(LSF) | ACC(LSF) |
| MULTI-LANE OPERATION | LANE CHANGE | Allow | Restrict | AD/V2X | AD/V2X |
| | MERGING/BRANCHING | Allow | Restrict | AD/V2X | AD/V2X |
| | ROAD SHOULDER STOP | Allow | Restrict | AD/V2X | AD/V2X |
| | RIGHT/LEFT TURN | Allow | Restrict | AD/V2X | AD/V2X |

FIG. 7

| 700 | | HIGH QUALITY | LIMIT QUALITY | MEDIUM QUALITY | LOW QUALITY |
|---|---|---|---|---|---|
| MODE | | 702 | 703 | 704 | 705 |
| OPERATION MODE | LEADING MODE | Allow | Allow | Restrict | Forbid |
| | ASSISTING MODE | Allow | Allow | Allow | Allow |
| DISPLAY MODE | IMAGE DISPLAY MODE | Allow | Restrict | Restrict | Forbid |
| | VIRTUAL DISPLAY MODE | Allow | Allow | Allow | Allow |

FIG. 8

REMOTE OPERATION DEVICE AND REMOTE OPERATION METHOD

CROSS-REFERENCE TO RELATED APPLICATION(S)

This application is a continuation of International Patent Application No. PCT/JP2019/014301 filed on Mar. 29, 2019, the entire disclosures of which is incorporated herein by reference.

BACKGROUND OF THE INVENTION

Field of the Invention

The present disclosure relates to a remote operation device and a remote operation method.

Description of the Related Art

There is known a remote driving technology in which an operator located at a remote place operates a vehicle. In remote driving, one of required elements is that a communication delay between an operator device for an operator who performs remote driving and a user terminal mounted on a vehicle is sufficiently suppressed. In Japanese Patent Laid-Open No. 2013-115803, the amount of communication is reduced by transmitting difference information of three-dimensional map data of an environment around a vehicle.

SUMMARY OF THE INVENTION

Even in a case where the amount of communication between an operation target device and a remote operation device is reduced, the quality of communication between these devices may be deteriorated due to other causes (for example, convergence of a communication system). Depending on the communication quality, an operation performed by the remote operation device may cause unintended behavior of the target device. Some aspects of the present disclosure provide a technology for enabling a remote operation device to safely operate a remote device.

In an embodiment, provided is a remote operation device for operating a remote target device, the remote operation device including: an acquisition unit for acquiring quality of communication between the target device and the remote operation device; and a setting unit for setting an authority of the remote operation device related to an operation of the target device based on the communication quality.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
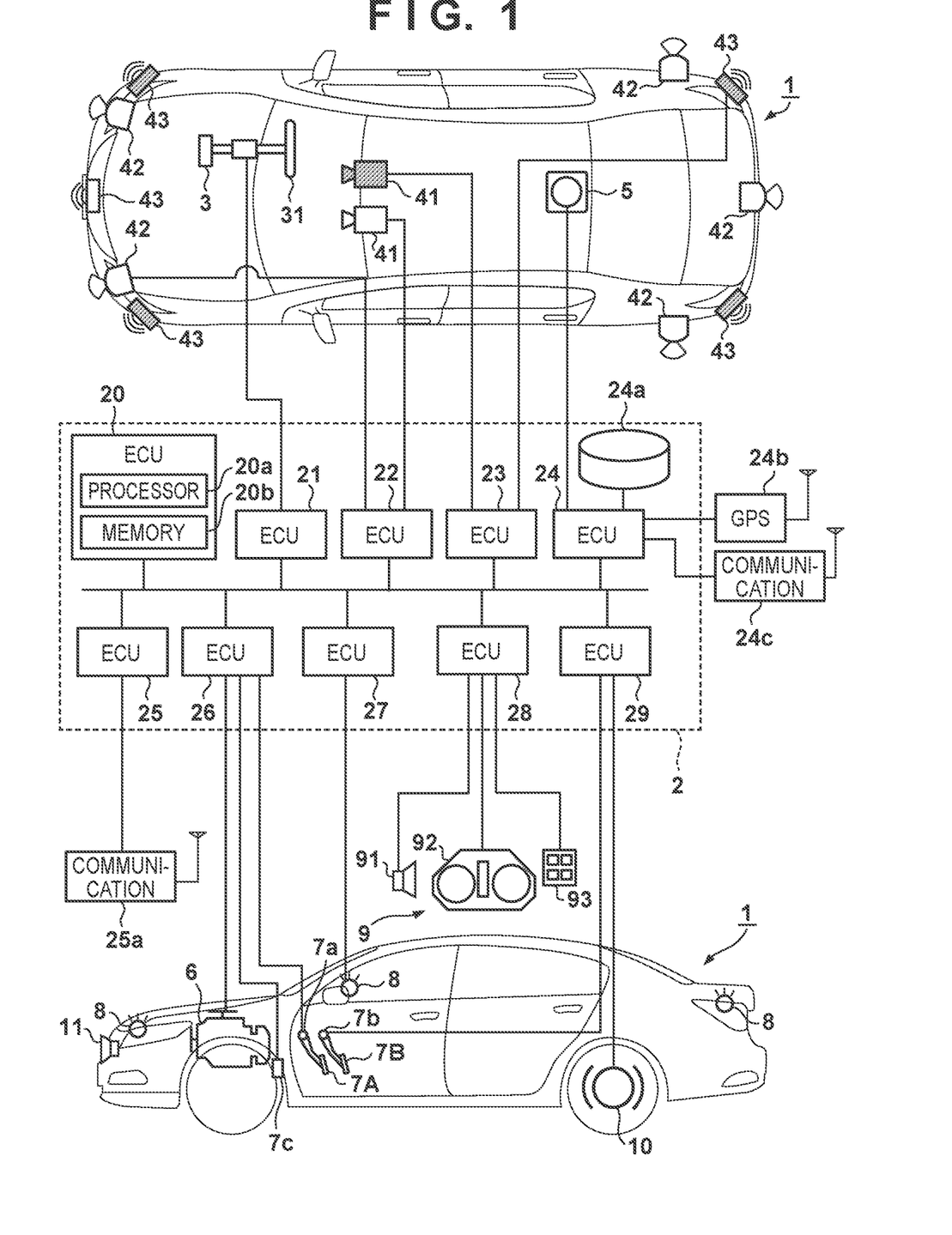
FIG. 1 is a block diagram for describing an example of a configuration of a vehicle according to an embodiment.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24*b*, and a communication device 24*c* and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24*b* detects the current position of the vehicle 1. The communication device 24*c* performs wireless communication with a server that provides map information and traffic information and acquires these pieces of information. The ECU 24 can access a map information database 24*a* constructed in the memory, and the ECU 24 searches for a route from the current position to a destination and the like. The ECU 24, the map database 24*a*, and the GPS sensor 24*b* constitute a so-called navigation device.

The ECU 25 includes a communication device 25*a* for vehicle-to-vehicle communication. The communication device 25*a* performs wireless communication with other surrounding vehicles to exchange information between the vehicles. The communication device 25*a* is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7*a* provided on an accelerator pedal 7A and switches the gear ratio of the transmission based on information such as a vehicle speed detected by a vehicle speed sensor 7*c*. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7*b* provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
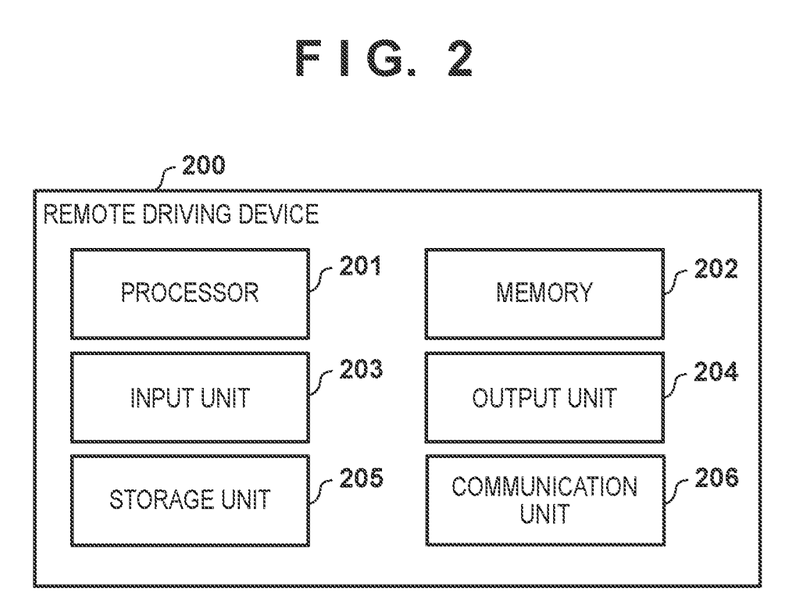
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

Figure 3:
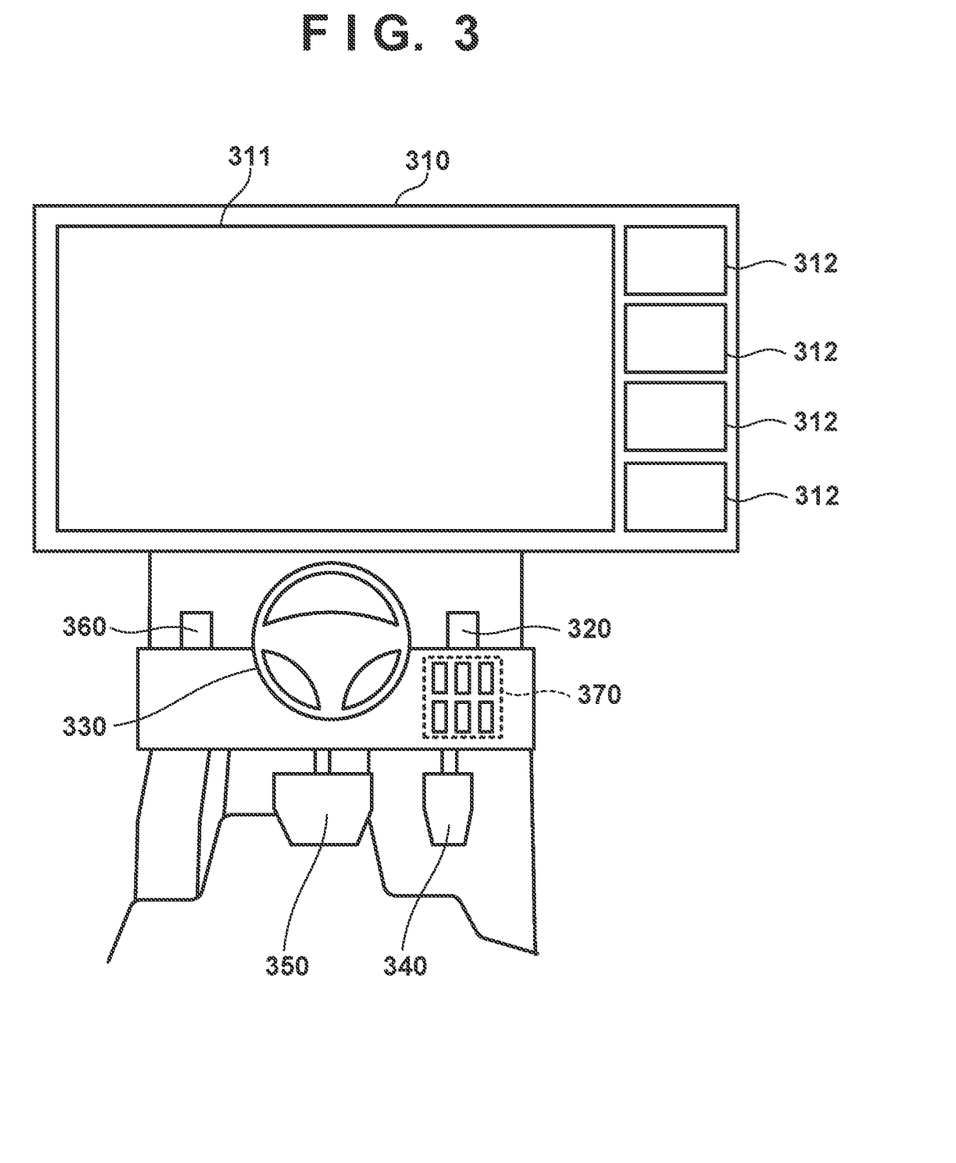
FIG. 3 is a schematic diagram for describing an example of a console for remote driving according to the embodiment.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Figure 4:
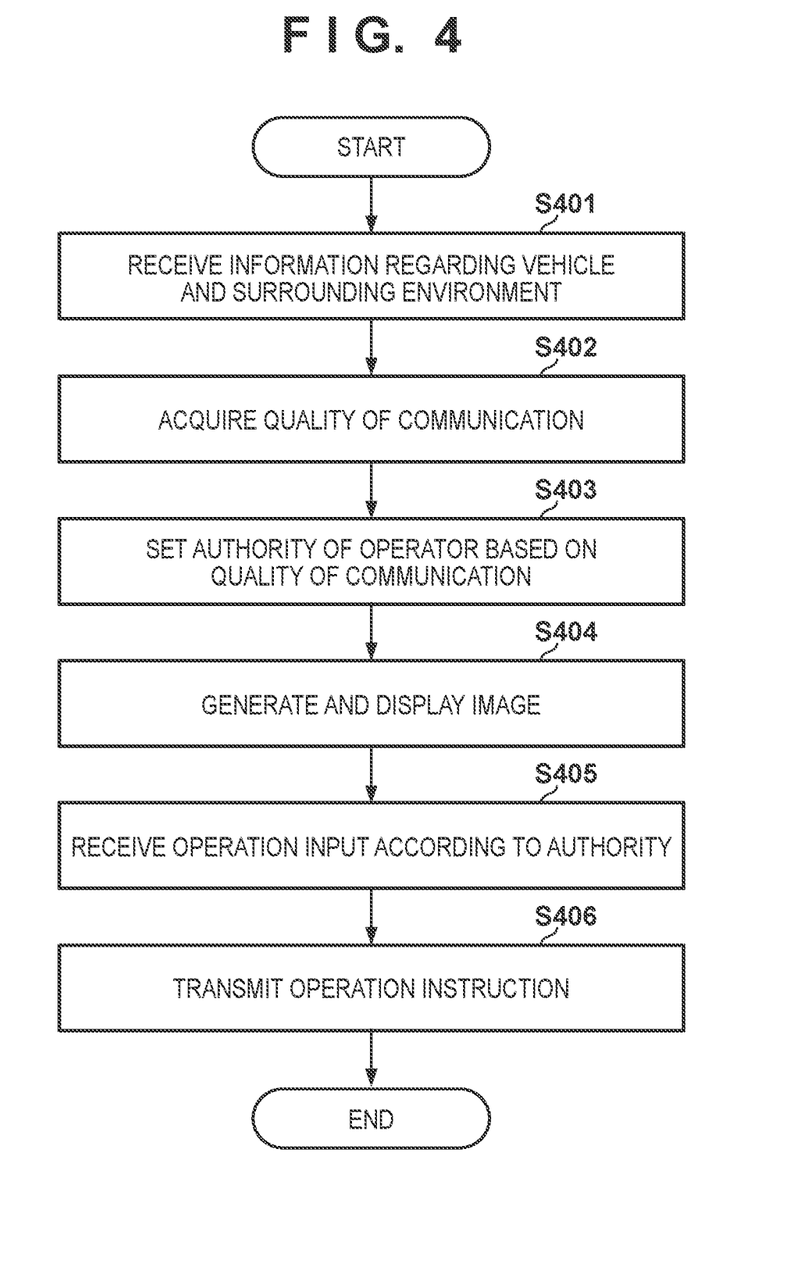
FIG. 4 is a flowchart for describing an example of a method for controlling the remote driving device according to the embodiment.

An example of a remote operation method executed by the remote driving device 200 will be described with reference to FIG. 4. This method may be executed by the processor 201 of the remote driving device 200 executing a program stored in the memory 202. Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The remote operation method of FIG. 4 is repeatedly executed while the remote driving device 200 is providing the remote driving service.

In step S401, the remote driving device 200 receives information regarding the vehicle 1 and a surrounding environment. The information regarding the vehicle 1 may include, for example, a remote service ID of the vehicle 1, the geographical position of the vehicle 1, the speed and acceleration of the vehicle 1, the pedal position of the vehicle 1, the steering angle of the vehicle 1, and the like. The information regarding the surrounding environment of the vehicle 1 may include measurement data obtained by detection units 41 to 43 of the vehicle 1 and data regarding a target around the vehicle 1 specified by the ECU 20 (for example, the type, geographical position, size, speed, acceleration, and the like of the target). The vehicle 1 may select information to be transmitted to the remote driving device 200 according to the communication quality thereof. For example, in a case where the communication quality of the vehicle 1 is low, the vehicle 1 does not transmit a large amount of measurement data obtained by the detection units 41 to 43 and may transmit the information regarding the target around the vehicle 1 specified based on the measurement data. Furthermore, the remote driving device 200 may receive the information regarding the surrounding environment of the vehicle 1 from a communication device (for example, a road management camera that captures an image of a roadway) other than the vehicle 1.

In step S402, the remote driving device 200 acquires communication quality of communication between the vehicle 1 and the remote driving device 200. The communication quality may include at least one of a throughput or a delay, or may include other elements. In order to acquire the communication quality, the remote driving device 200 may transmit and receive test data to and from the vehicle 1, or may specify a communication standard (3G, 4G, 5G, or the like) being used by the vehicle 1. Furthermore, in order to acquire the communication quality, the remote driving device 200 may inquire of the communication system about the communication quality at the geographical position of the vehicle 1.

In step S403, the remote driving device 200 sets an authority of the user of the remote driving device 200 related to the operation of the vehicle 1 based on the communication quality acquired in step S402. In other words, the remote driving device 200 determines whether to allow, limit (conditionally allow), or restrict a manual operation by the user of the remote driving device 200 for each of a plurality of operations to be performed on the vehicle 1 based on the communication quality. Hereinafter, the user of the remote driving device 200 is simply referred to as a user. For example, the remote driving device 200 sets the authority of the user so that the higher the communication quality, the broader the authority of the user. Details of the setting of the authority will be described later.

In step S404, the remote driving device 200 generates an image of the surrounding environment of the vehicle 1, and displays the image on the display device 310 (for example, the main region 311). The remote driving device 200 has two display modes, that is, an image display mode and a virtual display mode. In the image display mode, an image to be displayed on the display device 310 is generated based on an image captured by the camera 41 of the vehicle 1. In the virtual display mode, an image to be displayed on the display device 310 is generated using the information regarding the target around the vehicle 1 generated and transmitted by the vehicle 1 and a model and map data of a virtual object stored in advance in the memory 202. In the image display mode, since image data needs to be transmitted, a required communication amount is larger than that in the virtual display mode.

In step S405, the remote driving device 200 receives an operation input for the vehicle 1 from the user according to the authority. Specifically, in a case where the user performs an allowed operation, the remote driving device 200 accepts the operation, and in a case where the user performs an unallowed operation, the remote driving device 200 rejects the operation. The remote driving device 200 may change an input mode for receiving the operation input based on the authority. For example, the remote driving device 200 may change a behavior of an operation unit (for example, the steering wheel 330, the accelerator pedal 340, the brake pedal 350, and the switch 370). For example, in a case where acceleration/deceleration of the vehicle 1 by the user is restricted, the remote driving device 200 may be fixed so as not to operate the accelerator pedal 340 and the brake pedal 350. Instead of or in addition to changing the behavior of the operation unit, the remote driving device 200 may change a display mode of a screen included in an operation interface. The change of the display mode of the screen will be described later. In step S406, the remote driving device 200 generates an operation instruction for the vehicle 1 based on the received operation input, and transmits the operation instruction to the vehicle 1.

Figure 5:
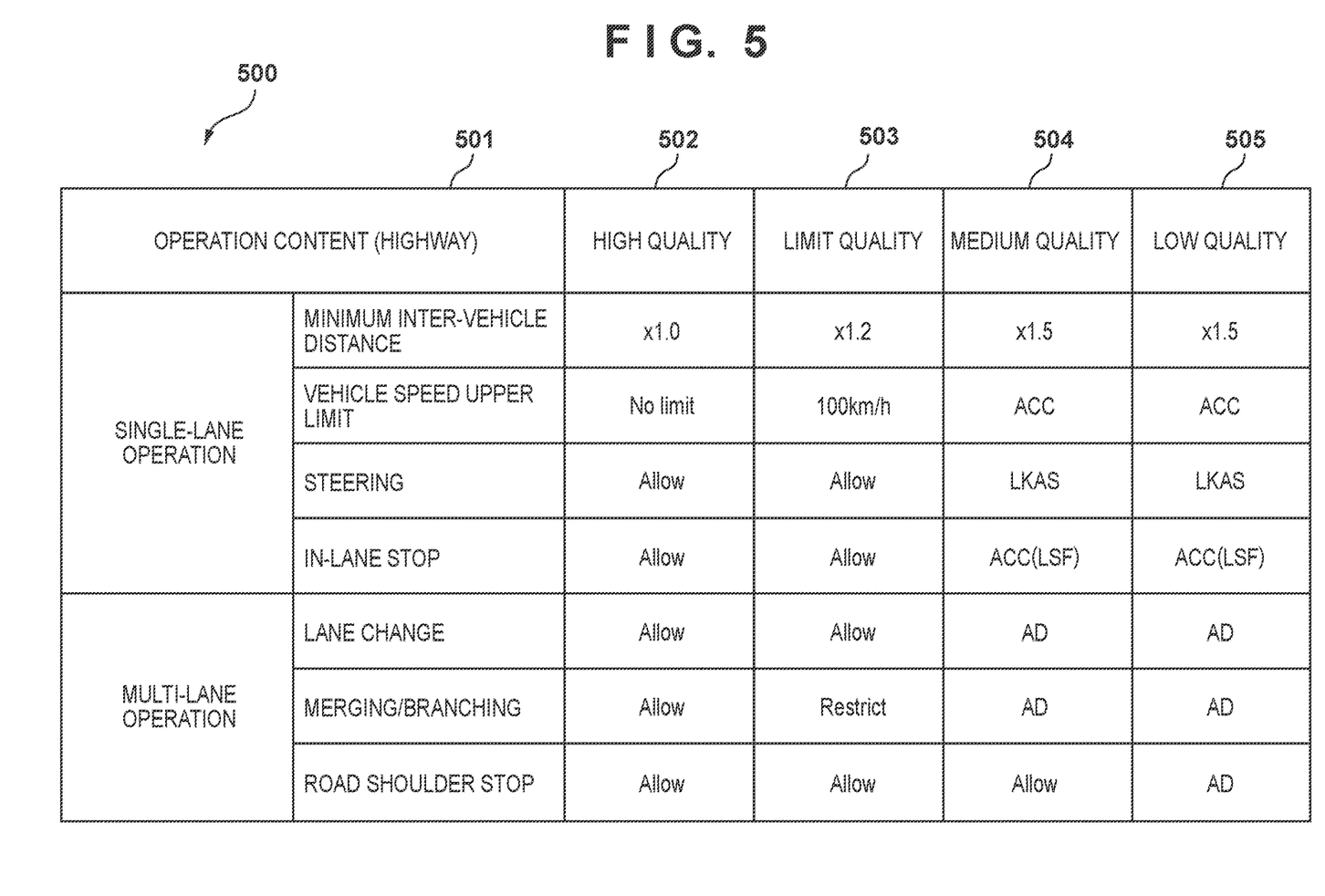
FIG. 5 is a diagram for describing an example of an authority table according to the embodiment.
Figure 6:
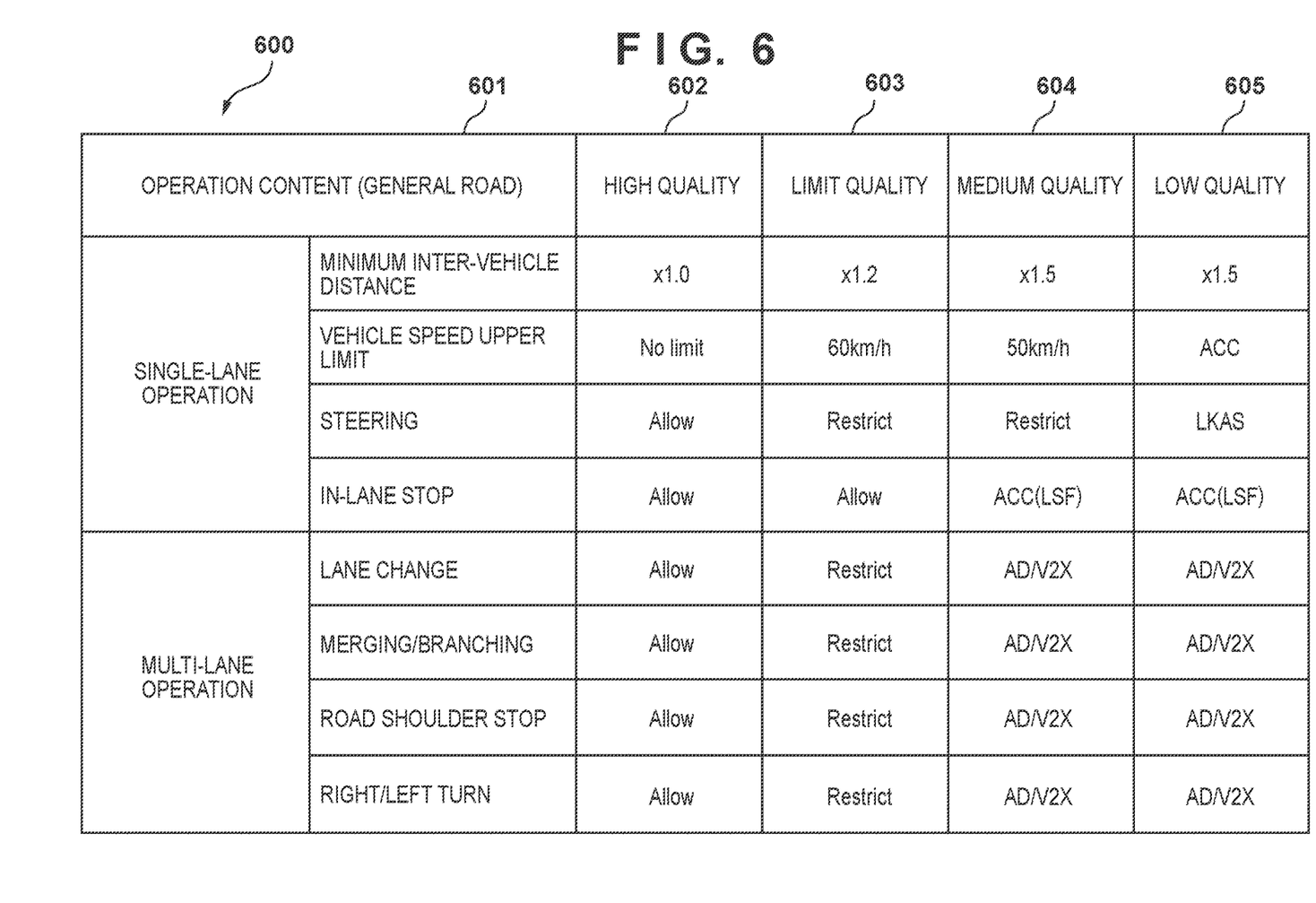
FIG. 6 is a diagram for describing an example of the authority table according to the embodiment.
Figure 7:
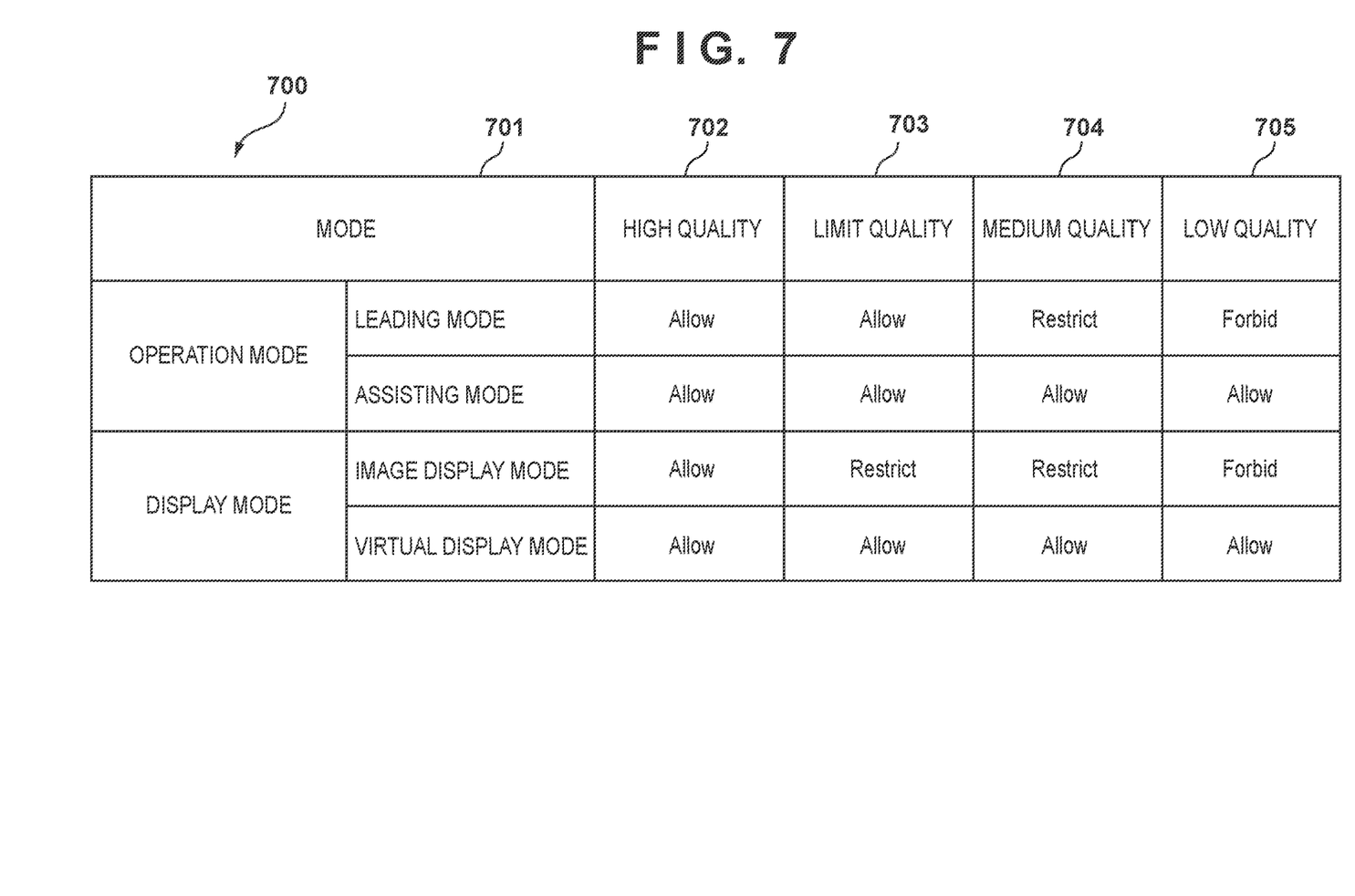
FIG. 7 is a diagram for describing an example of the authority table according to the embodiment.

A specific example of the setting of the authority in step S403 described above will be described with reference to FIGS. 5 to 7. FIG. 5 illustrates an authority table 500 related to an operation of the user in a case where the vehicle 1 is traveling on a highway. FIG. 6 illustrates an authority table 600 related to an operation of the user in a case where the vehicle 1 is traveling on a general road. FIG. 7 illustrates an authority table 700 related to a mode of the remote driving device 200 that can be set by the user. The authority tables 500, 600, and 700 are created in advance by a provider of the remote driving service and stored in the memory 202. The remote driving device 200 refers to these authority tables to set the authority of the user. The highway is an example of an environment where entry of pedestrians is restricted. The general road is an example of an environment where entry of pedestrians is allowed.

In the following example, an importance level of data transmitted and received by the vehicle 1 is classified into three levels, "high", "medium", and "low". The data with a high importance level is data essential for the remote driving of the vehicle 1 (for example, information regarding the geographical position of the vehicle 1 and a target positioned in a traveling direction of the vehicle 1). The data with a medium importance level is data supplementarily used for the remote driving of the vehicle 1 (for example, information regarding a target positioned in a direction other than the traveling direction of the vehicle 1). The data with a low importance level is data not used for the remote driving of the vehicle 1 (for example, data related to in-vehicle entertainment).

Furthermore, the quality of communication between the vehicle 1 and the remote driving device 200 is classified into four levels, "high quality", "limit quality", "medium quality", and "low quality". The "high quality" is quality at which a throughput of communication of the vehicle 1 is higher than a threshold and/or a delay is short than a threshold. In a case where the communication quality is the "high quality", the vehicle 1 transmits and receives data with all importance levels. The "limit quality" is a quality lower than the "high quality" (low throughput and/or long delay, the same applies below). In a case where the communication quality is the "limit quality", the vehicle 1 transmits and receives data with a high or medium importance level, and does not transmit and receive data with a low importance level. The limit quality is a limit of quality for transmitting and receiving all data used for the remote driving. The "medium quality" is quality lower than the "limit quality". In a case where the communication quality is the "medium quality", the vehicle 1 transmits and receives data with a high importance level and does not transmit and receive data with a medium or low importance level. The "low quality" is quality lower than the "medium quality". In a case where the communication quality is the "low quality", the vehicle 1 transmits and receives data with a high importance level and does not transmit and receive data with a medium or low importance level.

The operation authority of the user in a case where the vehicle 1 is traveling on a highway will be described with reference to the authority table 500 of FIG. 5. A column 501 indicates an operation content for the vehicle 1. A column 502, a column 503, a column 504, and a column 505 indicate whether or not each operation is allowed to the user in a case where the communication quality is the "high quality", the "limit quality", the "medium quality", and the "low quality", respectively.

The operation content is roughly divided into an operation to be completed within a single lane ("single-lane operation") and an operation to be performed over a plurality of lanes ("multi-lane operation"). "Minimum inter-vehicle distance" indicates a minimum value of an allowable inter-vehicle distance from a preceding vehicle. A recommended inter-vehicle distance varies depending on the speed of the vehicle 1. The authority table 500 defines the "minimum inter-vehicle distance" by a ratio with respect to the recommended inter-vehicle distance at each speed. The higher the communication quality, the shorter the minimum inter-vehicle distance.

"Vehicle speed upper limit" indicates a maximum value of the allowable vehicle speed. The remote driving device 200 allows the user to manually control the acceleration/deceleration of the vehicle 1 in a case of the high quality. Therefore, the user can manually control the acceleration/deceleration of the vehicle 1 so that the speed of the vehicle 1 reaches an arbitrary speed. The user observes a legal speed limit at his/her own responsibility. In a case of the limit quality, the remote driving device 200 limits the vehicle speed upper limit to 100 km/h and allows the user to manually control the acceleration/deceleration of the vehicle 1 so as not to exceed this limit. The remote driving device 200 restricts the user from manually controlling the acceleration/deceleration of the vehicle 1 in a case of the medium quality or low quality. In this case, the vehicle 1 accelerates or decelerates itself by an adaptive cruise control (ACC) function. The ACC function is a function of performing following traveling while maintaining an inter-vehicle distance from a preceding vehicle. At this authority level, the upper limit of the traveling speed of the vehicle 1 is equal to or lower than the speed of the preceding vehicle of the vehicle 1. In a case where the ACC function cannot be executed, the vehicle 1 stops at a safe place and waits for the communication quality to recover or the start of manual driving by the driver. In other cases where the manual operation by the user is restricted, the vehicle 1 performs similar operations.

"Steering" indicates whether or not the steering of the vehicle 1 is allowed. The remote driving device 200 allows the user to manually steer the vehicle 1 in a case of the high quality and limit quality. The remote driving device 200 restricts the user from manually steering the vehicle 1 in a case of the medium quality or low quality. In this case, the vehicle 1 steers itself by a lane keeping assist system (LKAS) function. The LKAS function is a function of keeping the center of the vehicle 1 at the center of a lane. In a case of the medium quality and the low quality, data of a target on the side and the rear of the vehicle 1 is not transmitted, such that the steering based on the determination of the user is restricted.

"In-lane stop" indicates whether or not an operation of stopping the vehicle 1 in a lane is allowed. The remote driving device 200 allows the user to manually stop the vehicle 1 in the lane in a case of the high quality and limit quality. Here, the stop by the manual operation includes that the driver operates the steering wheel 330 and the brake pedal 350 to stop the vehicle 1 and that the driver transmits a stop instruction to the vehicle 1 by pressing the switch 370. The same applies to the following other manual operations. The remote driving device 200 restricts the user from manually stopping the vehicle 1 in the lane in a case of the medium quality or low quality. In this case, the vehicle 1 can stop in the lane by the ACC function and a low speed following (LSF) function. The LSF function is a function of performing following traveling while maintaining an inter-vehicle distance from a preceding vehicle in a low speed range.

"Lane change" indicates whether or not a lane change operation of the vehicle 1 is allowed. The remote driving device 200 allows the user to manually make the lane change of the vehicle 1 in a case of the high quality and limit quality. The remote driving device 200 restricts the user from manually making the lane change of the vehicle 1 in a case of the medium quality and low quality. In this case, the vehicle 1 makes the lane change by the automated driving function.

"Merging/branching" indicates whether or not a merging/branching operation of the vehicle 1 is allowed. The remote driving device 200 allows the user to manually perform the merging/branching of the vehicle 1 in a case of the high quality. In a case of the limit quality, the remote driving device 200 conditionally (for example, in a case of an environment with a low difficulty level) allows the user to manually perform the merging/branching of the vehicle 1. The remote driving device 200 restricts the user from manually performing the merging/branching of the vehicle 1 in a case of the medium quality or low quality. In this case, the vehicle 1 performs the merging/branching by the automated driving function.

"Road shoulder stop" indicates whether or not an operation of stopping the vehicle 1 on a road shoulder is allowed. The remote driving device 200 allows the user to manually stop the vehicle 1 on the road shoulder in a case of the high quality, limit quality, and medium quality. The remote driving device 200 restricts the user from manually stopping the vehicle 1 on the road shoulder in a case of the low quality. In this case, the vehicle 1 stops on the road shoulder by the automated driving function.

The operation authority of the user in a case where the vehicle 1 is traveling on a general road will be described with reference to the authority table 600 of FIG. 6. Columns 601 to 605 are similar to the columns 501 to 505. Hereinafter, differences from the authority table 500 will be mainly described.

"Right/left turn" indicates whether or not an operation of turning the vehicle 1 right or left is allowed. The remote driving device 200 allows the user to manually turn the vehicle 1 right or left in a case of the high quality. In a case of the limit quality, the remote driving device 200 conditionally (for example, in a case where there is no pedestrian around the vehicle 1) allows the user to manually turn the vehicle 1 right or left. The remote driving device 200 restricts the user from manually turning the vehicle 1 right or left in a case of the medium quality or low quality. In this case, the vehicle 1 turns right or left by the automated driving function. The turning to the right or left by the automated driving function may be performed on the premise that the vehicle 1 can collect information on the surrounding of the vehicle 1 by V2X communication.

"Minimum inter-vehicle distance" is the same as that in a case of the highway. As for "vehicle speed upper limit", the remote driving device 200 gives a broader authority to the general road than to the highway. Specifically, even in a case of the medium quality, the remote driving device 200 sets the upper limit value to a low value to enable the user to perform a manual operation. This is because a traveling speed range of the general road is lower than a traveling speed range of the highway, and thus it is considered that the user can cope with a long delay.

As for "steering", in a case of the limit quality and medium quality, the remote driving device 200 allows the user to perform manual steering under that condition that the LKAS function is prioritized. Specifically, the remote driving device 200 turns on the LKAS function of the vehicle 1 and allows an operation for movement in a width direction in a lane within a range allowed by the LKAS function.

For each operation of "multi-lane operation", the remote driving device 200 conditionally allows the user to perform a manual operation in a case of the limit quality. This condition may be based on, for example, a situation of traffic participants around the vehicle 1. For example, in a case where there is no pedestrian around the vehicle 1, the remote driving device 200 allows the user to perform a manual operation. Unlike the highway, on the general road, there is a possibility that a pedestrian is present around the vehicle 1, and thus the remote driving device 200 narrows the authority in this way. Furthermore, in a case of the medium quality and low quality, the remote driving device 200 may set, as a precondition for execution of the automated driving function, that the vehicle 1 can collect information on the surrounding of the vehicle 1 by V2X communication.

The authority related to the mode of the remote driving device 200 that can be set by the user will be described with reference to authority table 700 in FIG. 7. A column 701 indicates a mode that the user can use with the remote driving device 200. Columns 702 to 705 are similar to the columns 502 to 505.

As described above, there are two modes in which the user operates the vehicle 1 by using the remote driving device 200, a leading mode and an assisting mode. In the assisting mode, since the automated driving function of the vehicle 1 autonomously performs a traveling control, an influence of the delay is small. Therefore, the remote driving device 200 allows the assisting mode to be selected at all the communication qualities. On the other hand, in the leading mode, since the user determines execution of an operation, the influence of the delay is large. Therefore, the remote driving device 200 allows the leading mode to be selected in a case of the high quality and limit quality. In a case of the medium quality, the remote driving device 200 conditionally allows the leading mode to be selected. For example, the remote driving device 200 may allow execution of the leading mode only for an operation of following a preceding vehicle. On the other hand, the remote driving device 200 restricts the leading mode from being selected in a case of the low quality.

Next, display mode selection will be described. As described above, in the image display mode, the image obtained by the camera 41 is displayed as it is, and thus, a required communication amount is large. Therefore, the remote driving device 200 allows the image display mode to be selected in a case of the high quality. In addition, the remote driving device 200 allows the image display mode to be conditionally selected in a case of the limit quality and medium quality. For example, the remote driving device 200 allows the image display mode to be selected in a case where highly accurate map information can be acquired and low-resolution image data can be complemented. The remote driving device 200 restricts the image display mode from being selected in a case of the low quality. On the other hand, since the virtual display mode requires a small communication amount, the remote driving device 200 allows the virtual display mode to be selected at all communication qualities.

Figure 8:
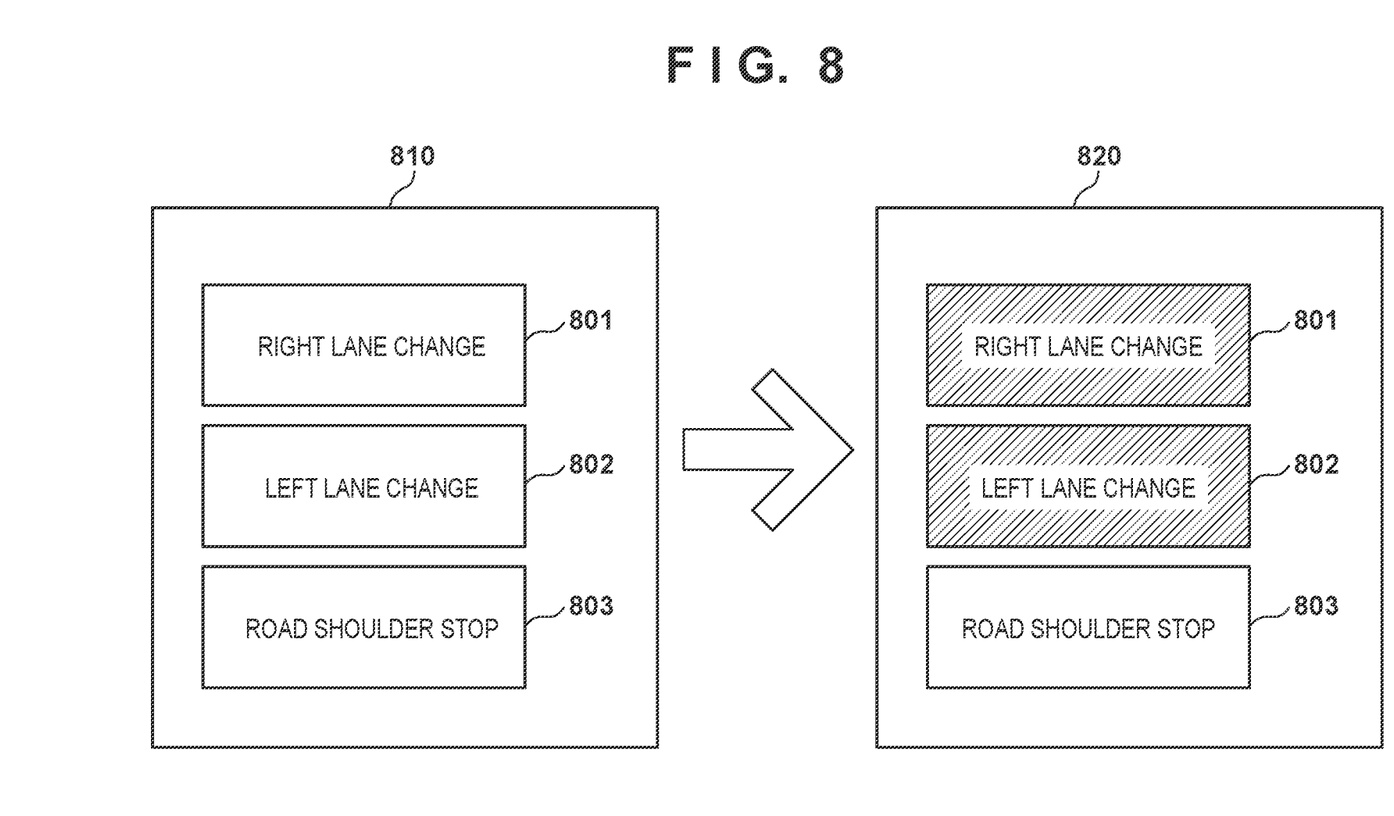
FIG. 8 is a schematic diagram for describing an example of an operation interface according to the embodiment.

An example of the operation interface when receiving an operation input according to the authority in step S405 will be described with reference to FIG. 8. In the following example, the remote driving device 200 determines a display mode (for example, appearance) of the operation interface for receiving the operation input based on the authority. The operation interface includes, as the switch 370, for example, a switch 801 for giving an instruction to make a lane change to the right, a switch 802 for giving an instruction to make a lane change to the left, and a switch 803 for giving an instruction to stop on a road shoulder. Each of these switches is a virtual switch on a touch screen. These switches are used by the user to manually control the behavior of the vehicle 1.

The remote driving device 200 displays a screen 810 as the operation interface in a case of the limit quality. As described above, in a case of the limit quality, the user is allowed to manually make a lane change and stop the vehicle on the road shoulder. Therefore, on the screen 810, any of the switches 801, 802, and 803 can be selected. Thereafter, in response to a decrease in communication quality to the medium quality, the remote driving device 200 switches the operation interface to the screen 820. As described above, in a case of the medium quality, the user is allowed to manually stop the vehicle on the road shoulder and is restricted from manually making a lane change. Therefore, on the screen 820, the switch 803 can be selected, but the switches 801 and 802 cannot be selected. The fact that the switch cannot be selected is indicated on the screen 820 by graying out the switch. Alternatively, the entire switch may be hidden. By changing the display mode of the operation interface in this manner, the user can easily grasp the operation that can be performed with the current authority.

In the above-described embodiment, a case where the operator (operation subject) of the remote driving device 200 is a person, and the authority of the person for making an operation input for the remote driving device 200 is set has been described. Alternatively, the above-described embodiment can also be applied to a case where the operator (operation subject) of the remote driving device 200 is artificial intelligence (AI). In this case, in the remote driving device 200, an operation by the AI is restricted based on the authority described above.

In the above-described embodiment, a case where the operation target device of the remote driving device 200 is the vehicle 1 has been described. The operation target of the present disclosure is not limited to the vehicle 1. For example, the operation target device may be a mobile object other than a vehicle, for example, a robot that guides livestock such as sheep and cattle instead of a herding dog in a meadow. Furthermore, the operation target device may be a device other than a mobile object, for example, a traffic guidance robot used at a fixed position. In a case where the operation target device is a device other than a vehicle, the remote driving device 200 may be generally referred to as a remote operation device.

Summary of Embodiment

<Configuration 1>
A remote operation device (200) for operating a remote target device (1), the remote operation device including:
  acquisition means (S402) that acquires quality of communication between the target device and the remote operation device; and
  setting means (S403) that sets an authority (500, 600, and 700) of the remote operation device related to an operation of the target device based on the communication quality.

With this configuration, the remote operation device can safely operate the remote device.

<Configuration 2>

The remote operation device according to Configuration 1, in which the setting means sets the authority so that the higher the communication quality, the broader the authority.

With this configuration, an appropriate authority can be set according to the communication quality.

<Configuration 3>

The remote operation device according to Configuration 1 or 2, in which the target device is a mobile object (1), and the setting means sets the authority further based on a movement speed of the target device.

With this configuration, an appropriate authority can be set according to the movement speed of the target device.

<Configuration 4>

The remote operation device according to any one of Configurations 1 to 3, in which the target device is a vehicle (1), and the setting means sets the authority at predetermined communication quality so that an upper limit of the movement speed of the target device is equal to or lower than a speed of a preceding vehicle of the vehicle.

With this configuration, the vehicle as the target device can travel at an appropriate speed.

<Configuration 5>

The remote operation device according to any one of Configurations 1 to 4, in which the target device is a vehicle (1), and the setting means sets the authority further based on a situation of a traffic participant around the target device.

With this configuration, the authority can be set in consideration of safety for traffic participants.

<Configuration 6>

The remote operation device according to any one of Configurations 1 to 5, in which the target device is a vehicle (1), and for a predetermined operation, the setting means makes the authority in a first situation in which the communication quality is first quality and the target device is in an environment where entry of pedestrians is restricted broader than the authority in a second situation in which the communication quality is the first quality and the target device is in an environment where entry of pedestrians is allowed.

With this configuration, the authority can be set according to whether or not entry of pedestrians is allowed.

<Configuration 7>

The remote operation device according to Configuration 6, in which making the authority broader includes increasing an upper limit of a movement speed of the target device.

With this configuration, the target device can be operated at a safe speed.

<Configuration 8>

The remote operation device according to any one of Configurations 1 to 7, further including input means (S405) that receives an operation input for the target device from a user of the remote operation device according to the authority.

With this configuration, the user of the remote operation device can safely operate the remote device.

<Configuration 9>

The remote operation device according to Configuration 8, in which the input means changes an input mode of an operation interface (330, 340, 350, and 370) for receiving the operation input based on the authority.

With this configuration, the user can easily grasp the allowed operation.

<Configuration 10>

The remote operation device according to Configuration 9, in which the change of the input mode of the operation interface includes at least one of a change of a display mode (801 to 803) of a screen included in the operation interface or a change of a behavior of an operation unit.

With this configuration, the user can easily grasp the allowed operation.

<Configuration 11>

A program for causing a computer to function as each means of the remote operation device according to any one of Configurations 1 to 10.

With this configuration, the above configurations can be implemented in a form of a program.

<Configuration 12>

A remote operation method for operating a remote target device (1), the remote operation method including:

an acquisition step (S402) of acquiring quality of communication between the target device and the remote operation device; and a setting step (S403) of setting an authority (500, 600, and 700) of the remote operation device related to an operation of the target device based on the communication quality.

The remote operation device can safely operate the remote device.

The invention is not limited to the foregoing embodiments, and various variations/changes are possible within the spirit of the invention.

What is claimed is:

1. A remote operation device for remotely operating a target vehicle, the remote operation device comprising at least one processor circuit and a memory comprising instructions, that when executed by the processor circuit, cause the processor circuit to at least:

acquire a quality of communication between the target vehicle and the remote operation device;

set an authority of the remote operation device related to an operation of the target vehicle based on the quality of communication;

display, on a display device, an image of a surrounding environment of the target vehicle; and for a predetermined operation, make the authority in a first situation in which the quality of communication is first quality and the target vehicle is in an environment where entry of pedestrians is restricted broader than the authority in a second situation in which the quality of communication is the first quality and the target vehicle is in an environment where entry of pedestrians is allowed.

2. The remote operation device according to claim 1, wherein the instructions further cause the processor circuit to set the authority so that the higher the quality of communication, the broader the authority.

3. The remote operation device according to claim 1, wherein the instructions further cause the processor circuit to set the authority further based on a movement speed of the target vehicle.

4. The remote operation device according to claim 1, wherein the instructions further cause the processor circuit to set the authority at predetermined communication quality so that an upper limit of a movement speed of the target vehicle is equal to or lower than a speed of a preceding vehicle of the target vehicle.

5. The remote operation device according to claim 1, wherein the instructions further cause the processor circuit to set the authority further based on a situation of a traffic participant around the target vehicle.

6. The remote operation device according to claim 1, wherein making the authority broader includes increasing an upper limit of a movement speed of the target vehicle.

7. The remote operation device according to claim 1, wherein the instructions further cause the processor circuit to receive an operation input for the target vehicle from a user of the remote operation device according to the authority.

8. The remote operation device according to claim 7, wherein the instructions further cause the processor circuit to change an input mode of an operation interface for receiving the operation input based on the authority.

9. The remote operation device according to claim 8, wherein the change of the input mode of the operation interface includes at least one of a change of a display mode of a screen included in the operation interface or a change of a behavior of an operation element.

10. A non-transitory storage medium comprising a program for causing a computer to function as the remote operation device according to claim 1.

11. A remote operation method for remotely operating a target vehicle, the remote operation method comprising:
acquiring a quality of communication between the target vehicle and a remote operation device;
setting an authority of the remote operation device related to an operation of the target vehicle based on the quality of communication; and
displaying, on a display device, an image of a surrounding environment of the target vehicle;
for a predetermined operation, making the authority in a first situation in which the quality of communication is first quality and the target vehicle is in an environment where entry of pedestrians is restricted broader than the authority in a second situation in which the quality of communication is the first quality and the target vehicle is in an environment where entry of pedestrians is allowed.

* * * * *